US012590853B2

(12) United States Patent
Serra et al.

(10) Patent No.: US 12,590,853 B2
(45) Date of Patent: Mar. 31, 2026

(54) VEHICLE BRAKE PAD AND METHOD OF PRODUCTION THEREOF

(71) Applicant: ITT ITALIA S.R.L., Lainate (IT)

(72) Inventors: Stefano Serra, San Pietro Val Lemina (IT); Umberto Vignolo, Barge (IT); Marco Terranova, Turin (IT)

(73) Assignee: Itt Italia S.R.L., Lainate (IT)

( * ) Notice: Subject to any disclaimer, the term of this patent is extended or adjusted under 35 U.S.C. 154(b) by 581 days.

(21) Appl. No.: 18/007,915

(22) PCT Filed: May 21, 2021

(86) PCT No.: PCT/EP2021/063614
§ 371 (c)(1),
(2) Date: Dec. 2, 2022

(87) PCT Pub. No.: WO2021/244874
PCT Pub. Date: Dec. 9, 2021

(65) Prior Publication Data
US 2023/0228631 A1 Jul. 20, 2023

(30) Foreign Application Priority Data

Jun. 5, 2020 (IT) ........................ 102020000013408

(51) Int. Cl.
*G01L 1/16* (2006.01)
*F16D 65/092* (2006.01)
(Continued)

(52) U.S. Cl.
CPC .............. *G01L 1/16* (2013.01); *F16D 65/092* (2013.01); *F16D 66/00* (2013.01); *G01L 5/28* (2013.01);
(Continued)

(58) Field of Classification Search
CPC ...... F16D 65/092; F16D 66/00; F16D 66/027; F16D 2066/001; F16D 2066/05;
(Continued)

(56) References Cited

U.S. PATENT DOCUMENTS 2,117,027 A 5/1938 Langbein
2,289,954 A 7/1942 Arndt
(Continued)

FOREIGN PATENT DOCUMENTS

CN 1678893 10/2005
CN 102317130 1/2012
(Continued)

OTHER PUBLICATIONS

International Search Report for PCT Application No. PCT/EP2021/063614, dated Aug. 11, 2021, in 3 pages.
(Continued)

*Primary Examiner* — Robert A. Siconolfi
*Assistant Examiner* — San M Aung
(74) *Attorney, Agent, or Firm* — Knobbe, Martens, Olson & Bear, LLP

(57) ABSTRACT

A vehicle brake pad (100) comprising: a support plate (21); a friction pad (20); at least a shear force sensing device; and an electrical circuit configured to collect signals from the shear force sensing device (1); wherein the shear force sensing device (1) comprises: a sheet (2) of piezoelectric material having a first and a second main faces (3, 4) parallel to each other identifying a shear stress direction(S); at least a first digitated reading electrode (5) located on the first main face (3); at least a second digitated reading electrode (6) located on the second main face (4), the first and second reading electrodes (5, 6) having digits (5a, 6a) aligned along a reading direction (R) orthogonal to the stress shear direction(S); at least a first digitated polarizing electrode (7)

(Continued)

located on the first main face (3) and interdigitated with the first digitated reading electrode (5); and at least a second digitated polarizing electrode (8) located on the second main face (4) and interdigitated with the second digitated reading electrode (6); and wherein the piezoelectric material has a bulk electric polarization with vector field (E) transversally oriented to the reading direction (R), each pair of aligned digits (5a, 6a) of the first and second reading electrodes (5, 6) enclosing a respective zone (2a) of the piezoelectric material having the vector field (E) most tangentially oriented to the shear stress direction(S).

15 Claims, 3 Drawing Sheets

(51) Int. Cl.
　　*F16D 66/00*　　　　(2006.01)
　　*G01L 5/28*　　　　(2006.01)
(52) U.S. Cl.
　　CPC .. *F16D 2066/005* (2013.01); *F16D 2066/006*
　　　　　　(2013.01); *F16D 2250/0084* (2013.01)
(58) Field of Classification Search
　　CPC ....... F16D 2066/006; F16D 2250/0084; G01L
　　　　　　　1/16; G01L 15/28; G01L 15/167; H10N
　　　　　　　　　　　　　　　30/87; H10N 30/302
　　USPC ..................................................... 188/251 R
　　See application file for complete search history.

(56)　　　　　　　　　References Cited

U.S. PATENT DOCUMENTS

| | | | |
|---|---|---|---|
| 2,540,194 | A | 2/1951 | Ellett |
| 3,489,931 | A | 1/1970 | Teaford |
| 3,689,880 | A | 9/1972 | McKee et al. |
| 3,724,916 | A | 4/1973 | Hirzel |
| 3,902,157 | A | 8/1975 | Kita et al. |
| 4,023,864 | A | 5/1977 | Lang et al. |
| 4,117,451 | A | 9/1978 | Sato et al. |
| 4,298,857 | A | 11/1981 | Robins et al. |
| 4,456,098 | A | 6/1984 | Lindre |
| 4,484,280 | A | 11/1984 | Brugger et al. |
| 4,495,434 | A | 1/1985 | Diepers et al. |
| 4,602,702 | A | 7/1986 | Ohta et al. |
| 4,623,044 | A | 11/1986 | Ohta et al. |
| 4,649,370 | A | 3/1987 | Thomason |
| 4,782,319 | A | 11/1988 | Dell'Acqua et al. |
| 4,854,424 | A | 8/1989 | Yamatoh et al. |
| 4,869,350 | A | 9/1989 | Fargier et al. |
| 4,901,055 | A | 2/1990 | Rosenberg et al. |
| 4,928,030 | A | 5/1990 | Culp |
| 5,090,518 | A | 2/1992 | Schenk et al. |
| 5,099,962 | A | 3/1992 | Furusu et al. |
| 5,115,162 | A | 5/1992 | Leonard et al. |
| 5,133,431 | A | 7/1992 | Braun |
| 5,176,034 | A | 1/1993 | Hazony et al. |
| 5,235,135 | A | 8/1993 | Knecht et al. |
| 5,302,940 | A | 4/1994 | Chen |
| 5,325,011 | A | 6/1994 | Kahn |
| 5,404,067 | A | 4/1995 | Stein |
| 5,406,682 | A | 4/1995 | Zimnicki et al. |
| 5,416,415 | A | 5/1995 | Dorri et al. |
| 5,419,415 | A | 5/1995 | Lamb et al. |
| 5,660,215 | A | 8/1997 | Nishikawa et al. |
| 5,719,577 | A | 2/1998 | Pitot et al. |
| 5,839,545 | A | 11/1998 | Preston et al. |
| 6,064,970 | A | 5/2000 | McMillan et al. |
| 6,122,585 | A | 9/2000 | Ono et al. |
| 6,179,091 | B1 | 1/2001 | Takanashi |
| 6,204,786 | B1 | 3/2001 | Bieth et al. |
| 6,247,560 | B1 | 6/2001 | Bunker |
| 6,310,545 | B1 | 10/2001 | Sapir |

| | | | |
|---|---|---|---|
| 6,339,956 | B1 | 1/2002 | Huinink et al. |
| 6,345,225 | B1 | 2/2002 | Bohm et al. |
| 6,414,818 | B1 | 7/2002 | Tanimoto |
| 6,477,893 | B1 | 11/2002 | Djordjevic |
| 6,529,803 | B2 | 3/2003 | Meyers et al. |
| 6,549,126 | B2 | 4/2003 | Hageman et al. |
| 6,612,736 | B2 | 9/2003 | Lee et al. |
| 6,668,983 | B2 | 12/2003 | Drennen et al. |
| 6,681,631 | B2 | 1/2004 | Apel |
| 6,813,581 | B1 | 11/2004 | Snyder |
| 6,823,242 | B1 | 11/2004 | Ralph |
| 6,934,618 | B2 | 8/2005 | Eckert et al. |
| 7,124,639 | B1 | 10/2006 | Kurtz et al. |
| 7,127,948 | B2 | 10/2006 | Tavares et al. |
| 7,331,427 | B2 | 2/2008 | Mohr |
| 7,451,653 | B1 | 11/2008 | Sippola |
| 7,694,555 | B2 | 4/2010 | Howell et al. |
| 8,026,802 | B2 | 9/2011 | Shimura |
| 8,287,055 | B2 | 10/2012 | Lee |
| 8,310,356 | B2 | 11/2012 | Evans et al. |
| 8,437,934 | B2 | 5/2013 | Degenstein |
| 8,456,061 | B2 | 6/2013 | Gibbons et al. |
| 8,573,045 | B2 | 11/2013 | Gotschlich |
| 8,676,721 | B2 | 3/2014 | Piovesan et al. |
| 8,717,158 | B2 | 5/2014 | Roach |
| 8,729,938 | B2 | 5/2014 | Watanabe |
| 8,789,896 | B2 | 7/2014 | Albright et al. |
| 8,958,966 | B2 | 2/2015 | Nohira et al. |
| 9,187,099 | B2 | 11/2015 | Powers et al. |
| 9,269,202 | B2 | 2/2016 | Phelan et al. |
| 9,286,736 | B2 | 3/2016 | Punjabi et al. |
| 9,316,278 | B2 | 4/2016 | Moore et al. |
| 9,353,815 | B1 | 5/2016 | Eden |
| 9,415,757 | B2 | 8/2016 | Martinotto et al. |
| 9,635,467 | B2 | 4/2017 | Miyoshi et al. |
| 9,827,961 | B2 | 11/2017 | Spieker et al. |
| 9,939,035 | B2 | 4/2018 | Donzelli et al. |
| 9,964,167 | B2 | 5/2018 | Martinotto et al. |
| 9,988,024 | B2 | 6/2018 | Schwartz et al. |
| 10,052,957 | B2 | 8/2018 | Azzi |
| 10,138,968 | B2 | 11/2018 | Donzelli et al. |
| 10,208,822 | B2 | 2/2019 | Donzelli et al. |
| 10,224,128 | B2 | 3/2019 | Lee |
| 10,227,064 | B2 | 3/2019 | Serra et al. |
| 10,295,006 | B2 | 5/2019 | Serra et al. |
| 10,408,292 | B2 | 9/2019 | Donzelli et al. |
| 10,451,130 | B2 | 10/2019 | Solari et al. |
| 10,495,168 | B2 | 12/2019 | Serra et al. |
| 10,598,239 | B2 | 3/2020 | Martinotto et al. |
| 10,677,304 | B2 | 6/2020 | Donzelli et al. |
| 10,955,017 | B2 | 3/2021 | Serra et al. |
| 11,047,440 | B2 | 6/2021 | Serra et al. |
| 11,441,629 | B2 | 9/2022 | Solari et al. |
| 11,519,475 | B2 | 12/2022 | Serra et al. |
| 11,885,386 | B2 | 1/2024 | Serra et al. |
| 2001/0042661 | A1 | 11/2001 | Treyde |
| 2001/0049577 | A1 | 12/2001 | Kesselgruber |
| 2002/0047496 | A1 | 4/2002 | Wierach |
| 2002/0095253 | A1 | 7/2002 | Losey et al. |
| 2002/0104717 | A1 | 8/2002 | Borugian |
| 2003/0062912 | A1 | 4/2003 | Nakajima |
| 2003/0111305 | A1 | 6/2003 | Drennen et al. |
| 2004/0015283 | A1 | 1/2004 | Eckert et al. |
| 2004/0041464 | A1 | 3/2004 | Eckert et al. |
| 2004/0187591 | A1 | 9/2004 | Baumann et al. |
| 2004/0238299 | A1 | 12/2004 | Ralea et al. |
| 2004/0242803 | A1 | 12/2004 | Ohme et al. |
| 2005/0029056 | A1 | 2/2005 | Baumgartner et al. |
| 2005/0103580 | A1 | 5/2005 | Kramer |
| 2005/0236104 | A1 | 10/2005 | Tanaka |
| 2005/0251306 | A1 | 11/2005 | Gowan et al. |
| 2006/0016055 | A1 | 1/2006 | Wilkie et al. |
| 2006/0076196 | A1 | 4/2006 | Palladino |
| 2006/0254868 | A1 | 11/2006 | Thiesing et al. |
| 2007/0024113 | A1 | 2/2007 | Thrush |
| 2007/0228824 | A1 | 10/2007 | Yasukawa et al. |
| 2007/0235268 | A1 | 10/2007 | Caron |
| 2007/0284713 | A1 | 12/2007 | Ninomiya et al. |
| 2008/0246335 | A1 | 10/2008 | Spieker et al. |

(56) References Cited

U.S. PATENT DOCUMENTS

| 2009/0033146 A1 | 2/2009 | Rieth et al. |
| 2009/0133971 A1 | 5/2009 | Baier-Welt |
| 2009/0157358 A1 | 6/2009 | Kim |
| 2009/0187324 A1 | 7/2009 | Lu et al. |
| 2009/0218179 A1 | 9/2009 | Yokoyama et al. |
| 2009/0223282 A1 | 9/2009 | Yamazaki |
| 2009/0289529 A1 | 11/2009 | Ito |
| 2010/0032898 A1 | 2/2010 | Gearty |
| 2010/0186938 A1 | 7/2010 | Murata et al. |
| 2010/0210745 A1 | 8/2010 | McDaniel |
| 2010/0211249 A1 | 8/2010 | McClellan |
| 2010/0250081 A1 | 9/2010 | Kinser et al. |
| 2010/0318258 A1 | 12/2010 | Katayama et al. |
| 2011/0050406 A1 | 3/2011 | Hennig et al. |
| 2011/0125381 A1 | 5/2011 | Szell et al. |
| 2012/0055257 A1 | 3/2012 | Shaw-Klein |
| 2013/0013348 A1 | 1/2013 | Ling et al. |
| 2013/0018266 A1 | 1/2013 | Nishikubo |
| 2013/0048443 A1 | 2/2013 | Muramatsu et al. |
| 2013/0192933 A1 | 8/2013 | King et al. |
| 2013/0206451 A1 | 8/2013 | Arai |
| 2013/0335487 A1 | 12/2013 | Cruz-Uribe et al. |
| 2014/0097951 A1 | 4/2014 | Grgic |
| 2014/0200784 A1 | 7/2014 | Nohira et al. |
| 2014/0257605 A1 | 9/2014 | Beck et al. |
| 2014/0311833 A1 | 10/2014 | Martinotto et al. |
| 2014/0337086 A1 | 11/2014 | Asenjo et al. |
| 2015/0112515 A1 | 4/2015 | Conway |
| 2016/0014526 A1 | 1/2016 | Miyoshi et al. |
| 2016/0084331 A1 | 3/2016 | Merlo et al. |
| 2016/0146279 A1 | 5/2016 | Philpott |
| 2016/0272176 A1 | 9/2016 | Furuyama |
| 2016/0341622 A1 | 11/2016 | Mensa |
| 2017/0002883 A1 | 1/2017 | Donzelli et al. |
| 2017/0030424 A1 | 2/2017 | Martinotto et al. |
| 2017/0052028 A1 | 2/2017 | Choudhury et al. |
| 2017/0082163 A1 | 3/2017 | Serra et al. |
| 2017/0082164 A1* | 3/2017 | Serra .............. F16D 65/092 |
| 2017/0082165 A1 | 3/2017 | Donzelli et al. |
| 2017/0082166 A1 | 3/2017 | Serra et al. |
| 2017/0082167 A1 | 3/2017 | Donzelli et al. |
| 2017/0234383 A1* | 8/2017 | Merlo .............. F16D 69/00 |
| | | 188/250 B |
| 2017/0267220 A1 | 9/2017 | Serra et al. |
| 2017/0331030 A1 | 11/2017 | Inoue et al. |
| 2018/0106319 A1 | 4/2018 | Solari et al. |
| 2018/0160248 A1 | 6/2018 | Murakami et al. |
| 2018/0231084 A1 | 8/2018 | Donzelli et al. |
| 2018/0244159 A1 | 8/2018 | Satterthwaite et al. |
| 2018/0306262 A1* | 10/2018 | Martinotto .............. G01L 1/16 |
| 2019/0003541 A1 | 1/2019 | Donzelli et al. |
| 2019/0005743 A1 | 1/2019 | Serra et al. |
| 2019/0078630 A1 | 3/2019 | Serra et al. |
| 2019/0241166 A1 | 8/2019 | Serra et al. |
| 2019/0249736 A1 | 8/2019 | Donzelli et al. |
| 2019/0338818 A1 | 11/2019 | Serra et al. |
| 2019/0351889 A1 | 11/2019 | Serra et al. |
| 2020/0088256 A1 | 3/2020 | Solari et al. |
| 2020/0124124 A1 | 4/2020 | Serra et al. |
| 2021/0071728 A1 | 3/2021 | Serra et al. |
| 2021/0148427 A1 | 5/2021 | Martinotto et al. |
| 2021/0348666 A1 | 11/2021 | Serra et al. |
| 2021/0388878 A1 | 12/2021 | Serra et al. |
| 2022/0364620 A1 | 11/2022 | Solari et al. |
| 2023/0235801 A1 | 7/2023 | Serra et al. |

FOREIGN PATENT DOCUMENTS

| CN | 102658812 | 9/2012 |
| CN | 102785648 | 11/2012 |
| CN | 104813060 | 2/2018 |
| CN | 104821372 | 6/2018 |
| DE | 10006012 | 9/2000 |
| DE | 10230008 | 1/2004 |
| DE | 10243127 | 3/2004 |
| DE | 10259629 | 7/2004 |
| DE | 10-2005-052630 | 3/2007 |
| DE | 10-2006-018952 | 10/2007 |
| DE | 10-2006-053489 | 5/2008 |
| DE | 10-2010-010482 | 8/2011 |
| DE | 10-2011-006002 | 9/2012 |
| DE | 10-2012-007118 | 10/2013 |
| EP | 0189076 | 7/1986 |
| EP | 0601681 | 6/1995 |
| EP | 0744558 | 11/1996 |
| EP | 0781936 | 7/1997 |
| EP | 1431606 | 6/2004 |
| EP | 1530037 | 5/2005 |
| EP | 1531110 | 5/2005 |
| EP | 1923592 | 5/2008 |
| EP | 2549556 | 1/2013 |
| EP | 2647866 | 10/2013 |
| EP | 2741063 | 6/2014 |
| EP | 2778462 | 9/2014 |
| EP | 2570691 | 10/2014 |
| FR | 2815040 | 4/2002 |
| GB | 2309057 | 7/1997 |
| GB | 2372825 | 9/2002 |
| GB | 2478423 | 9/2011 |
| JP | S57-011143 | 1/1982 |
| JP | S58-206458 | 12/1983 |
| JP | S61275049 | 12/1986 |
| JP | 04-054326 | 2/1992 |
| JP | H07-002107 | 1/1995 |
| JP | H09-002240 | 1/1997 |
| JP | H11-94707 | 4/1999 |
| JP | H11-125285 | 5/1999 |
| JP | 2002-130348 | 5/2002 |
| JP | 2002-538039 | 11/2002 |
| JP | 2003-104139 | 4/2003 |
| JP | 2003-205833 | 7/2003 |
| JP | 2005-035344 | 2/2005 |
| JP | 2006-193091 | 7/2006 |
| JP | 2007-224988 | 9/2007 |
| JP | 2011-116237 | 6/2011 |
| JP | 2012-202983 | 10/2012 |
| JP | 2014-234158 | 12/2014 |
| JP | 2016-516631 | 6/2016 |
| JP | 2016-521336 | 7/2016 |
| KR | 10-2002-0051429 | 6/2002 |
| KR | 10-2007-0027041 | 3/2007 |
| KR | 10-0791632 | 12/2007 |
| KR | 2009-0057640 | 6/2009 |
| KR | 10-2004-48957 | 6/2010 |
| KR | 2011-0043849 | 4/2011 |
| KR | 10-2013-0039804 | 4/2013 |
| KR | 10-2015-0045047 | 4/2015 |
| KR | 10-2016-0174510 | 12/2016 |
| KR | 10-2015-0143696 | 12/2019 |
| WO | WO 1999/08018 | 2/1999 |
| WO | WO 2004/027433 | 4/2004 |
| WO | WO 2011/116303 | 9/2011 |
| WO | WO 2014/170726 | 10/2014 |
| WO | WO 2014/170849 | 10/2014 |
| WO | WO 2015/013217 | 1/2015 |
| WO | WO 2016/038533 | 3/2016 |
| WO | WO 2016/189150 | 12/2016 |
| WO | WO 2017/145103 | 8/2017 |
| WO | WO 2018/019438 | 2/2018 |
| WO | WO2019/171289 | 9/2019 |
| WO | WO-2019171289 A1 * | 9/2019 | .............. G01L 1/16 |
| WO | WO 2020/074075 | 4/2020 |

OTHER PUBLICATIONS

Ait-Hammouda, Islam; "Jumps and Synchronization in Anti-Lock Brake Algorithms"; Oct. 2008, Japan, 7 pages; https://hal.archives-ouvertes.fr/hal-00525788.

Capra, D. et al.; An ABS Control Logic Based on Wheel Force Measurement. In: Vehicle System Dynamics; vol. 50, No. 12, pp. 1779-1796; http://porto.polito.it/2497487/.

(56) References Cited

OTHER PUBLICATIONS

Gustafsson, Fredrik; "Slip-based Tire-Road Friction Estimation"; Automatica, 1997; vol. 33, No. 6; pp. 1087-1099.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Ray, Laura; "Nonlinear Tire Force Estimation and Road Friction Identification: Simulation and Experiments"; Automatica, vol. 33, No. 10, pp. 1819-1833; 1997.
Solyom, Stefan, et al.; "Synthesis of a Model-Based Tire Slip Controller"; 2004; Vehicle System Dynamics, pp. 475-499; http://dx.doi.org/10.1080/004231105123313868.
"The Next Generation of Hub Units"; SKF Group; 2012, www.vsm.skf.com; 32 pages.
Von Wagner, et al., "Active Control of Brake Squeal Via 'Smart Pads'"; Oct. 10, 2004.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; peg. 81-97.
European Search Report; European Application No. EP 14158449; Aug. 6, 2014.
International Search Report; International Application No. PCT/IB2013/060881; Jul. 3, 2014.
International Search Report; International Application No. PCT/IB2014/060778; Aug. 6, 2014.
International Search Report; International Application No. PCT/IB2015/056861; Jan. 18, 2016.
International Search Report in PCT Application No. PCT/EP2016/071865 dated Dec. 13, 2016 in 3 pages.
International Search Report and Written Opinion; International Application No. PCT/EP2017/059238; Aug. 10, 2017, in 13 pages.
Chinese Office Action in Chinese Application No. 201680054121.1 dated Mar. 26, 2019 in 9 pages.
Chinese Office Action in Chinese Application No. 201680054121.1 dated Feb. 3, 2020 in 8 pages.
Chinese Office Action in Chinese Application No. 201680054121.1 dated Nov. 4, 2020 in 8 pages.
Chinese Office Action in Chinese Application No. 201680054121.1 dated Jan. 19, 2021 in 28 pages.
Chinese Office Action in Chinese Application No. 201780011871.5, dated Jun. 17, 2020 in 15 pages.
Chinese Search Report in Chinese Application No. 201780011871.5, dated Jun. 10, 2020 in 2 pages.
European Office Action in European Application No. 16770243.0 dated Oct. 15, 2019 in 5 pages.
European Office Action in European Application No. 16770243.0 dated Jan. 12, 2020 in 3 pages.
European Office Action in European Application No. 16770243.0 dated Jun. 23, 2020 in 5 pages.
Indian Office Action Indian Application No. 201837009364 dated Nov. 20, 2020 in 15 pages.
Official European Communication in European Application No. 16770243.0 dated Oct. 19, 2020 in 11 pages.
Written Opinion in PCT Application No. PCT/EP2016/071865 dated Dec. 13, 2020 in 6 pages.
Written Opinion in Japanese Application No. 2018513655 dated Oct. 12, 2020 in 4 pages.
Written Opinion in Japanese Application No. 2018-545192, dated Feb. 24, 2021, in 6 pages.
Written Amendment in Japanese Application No. 2018513655 dated Oct. 12, 2020 in 5 pages.
Japanese Written Amendment in Japanese Application No. 2018545192, dated Feb. 24, 2021 in 8 pages.
Italian Search Report and Written Opinion for IT TO2013A000307; dated Mar. 7, 2014, in 3 pages.
Italian Search Report and Written Opinion for Italian Patent Application No. IT UB20151291; May 28, 2015; 7 pages.
Italian Search Report and Written Opinion for Italian Patent Application No. IT UB20151059; May 28, 2015; 7 pages.

Italian Search Report and Written Opinion for Italian Patent Application No. IT UB20151184; May 28, 2015; 7 pages.
Italian Search Report and Written Opinion for ITTO 20130307; Mar. 7, 2014; 7 pages.
Italian Search Report Coversheet for Italian Patent Application No. 102015000018714/ITUB20151184; Jan. 26, 2016; 1 page.
Italian Search Report Coversheet for Italian Patent Application No. 102015000018748/ITUB20151291; Feb. 3, 2016; 1 page.
Italian Search Report Coversheet Italian Patent Application No. 102015000018701 ITUB20151029; Feb. 3, 2016; 1 page.
Italian Search Report for Italian Patent Application No. 102015000018771; Jan. 27, 2016; 1 page.
Italian Search Report for Italian Patent Application No. IO 56568 IT UB20151059; Jan. 20, 2016; 7 pages.
Italian Search Report for Italian Patent Application No. IO 56584/ITUB20151184; Jan. 14, 2016; 7 pages.
Italian Search Report for Italian Patent Application No. IO 56597/ITUB20151291; Jan. 25, 2016; 7 pages.
Italian Search Report Italian Patent Application No. IO 56565/ITUB20151029; Jan. 22, 2016; 8 pages.
Italian Search Report and Written Opinion for Italian Patent Application No. IT 201600077944 (IO 69013); May 26, 2017; 8 pages.
Japanese Office Action in Japanese Application No. 2018513655 dated Jul. 14, 2020 in 16 pages.
Japanese Office Action in Japanese Application No. 2018-545192, dated Jan. 5, 2021, in 17 pages.
Japanese Search Report in Japanese Application No. 2018513655 (0022000625) dated May 25, 2020 in 12 pages.
Copy of Italian Search Report, IO 58761 (IT UB20153706), dated May 25, 2016, 8 pages.
Copy of Italian Search Report, IO 58837 (IT UB20153709), dated May 31, 2016, 7 pages.
International Search Report and Written Opinion; International Application No. PCT/EP2017/054455, filed on Feb. 27, 2017; mailed on May 3, 2017, 9 pages.
Italian Search Report and Written Opinion for Application No. IT201900015839, dated Apr. 21, 2020, in 6 pages.
Chinese Office Action in Chinese Application No. 201980033093.9, dated Sep. 28, 2021, in 14 pages.
Chinese Office Action in Chinese Application No. 201980033093.9, dated Feb. 16, 2022, in 13 pages.
European Search Report and Opinion for EP Application No. 20193831.3, in 2 pages.
Office Action with English translation issued in Korean Application No. 10-2019-7004821, dated Feb. 10, 2021, in 18 pages.
Second Office Action with English translation in Chinese Application No. 201780045954.6, in 14 pages.
Search Report with English translation in Japanese Application No. JP 2019-503519, dated Dec. 10, 2020, in 22 pages.
Office Action with English translation in Japanese Application No. 2019-503519, dated Dec. 23, 2020, in 20 pages.
First Office Action with English translation in Chinese Application No. 201780045954.6, in 15 pages.
International Search Report and Written Opinion for Application No. PCT/EP2019/062680, dated Jun. 27, 2019, in 9 pages.
Italian Search Report for Italian Application No. IT 201800005484, mailed on Feb. 19, 2019, in 7 pages.
PCT International Search Report for PCT Application No. PCT/EP2016/071859, dated Nov. 11, 2016, in 3 pages.
International Preliminary Report on Patentability for PCT Application No. PCT/EP2016/071859, dated Mar. 20, 2018, in 6 pages.
Written Opinion for Japanese Application No. 2018-513768, dated Apr. 16, 2021, in 2 pages.
Notice of Reasons for Refusal for Japanese Application No. 2018-513768, dated Jan. 26, 2021, in 12 pages.
First Office Action in Chinese Application No. 201680052796.2, dated Sep. 19, 2019, in 11 pages.
Second Office Action in Chinese Application No. 201680052796.2, dated Apr. 24, 2020, in 12 pages.
Third Office Action in Chinese Application No. 201680052796.2, dated Feb. 9, 2021, in 9 pages.
First Office Action in Mexican Application No. MX/a/2018/003309, dated Sep. 4, 2019, in 3 pages.

(56)          References Cited

OTHER PUBLICATIONS

Second Office Action in Mexican Application No. MX/a/2018/ 003309, dated Mar. 18, 2020, in 5 pages.
Second Office Action in Chinese Application No. 201780011871.5, dated Feb. 19, 2021, in 8 pages.
Second Office Action in Japanese Application No. 2018-545192, dated Apr. 6, 2021, in 4 pages.
Written Opinion in Japanese Application No. 2018-545192, dated Jun. 21, 2021, in 2 pages.
Italian Search Report and Written Opinion for Italian Patent Application No. IT UB20151029; May 28, 2015; 8 pages.
Second Office Action in Mexican Application No. MX/a/2018/ 003309, dated Sep. 4, 2019, in 5 pages.
International Search Report for PCT Application No. PCT/EP2021/ 063634, dated Aug. 12, 2021, in 3 pages.

* cited by examiner

VEHICLE BRAKE PAD AND METHOD OF PRODUCTION THEREOF

FIELD

The following disclosure relates to a vehicle smart brake pad comprising at least a shear force sensing device, and a production process thereof.

SUMMARY

Piezoelectricity is the electric charge that accumulates inside a particular type of solid materials in response to external applied mechanical stress.

Piezoelectric materials include nanocrystals of quartz, tourmaline and Rochelle salt, but they show a relatively small piezoelectric response to external solicitations. To overcome this problem, some polycrystalline ferroelectric ceramics are synthesized, such as barium titanate ($BaTiO_3$) and lead zirconate titanate (PZT) such that the synthesized ceramic sexhibit larger displacements or induce larger electric voltages after mechanical stress is applied.

In particular, PZT piezoceramic materials can be used for actuator or sensor applications. The PZT materials are divided into two classes that differs from each other for the doping level inside the lattice substructure. The surplus or lack of charge inside the structure of the material influences the piezoelectric behavior and its field of use. PZT, which is considered "soft", is an often used material to convert mechanical vibration into electric signals.

In order to use these synthesized piezoelectric materials properly, a polarization procedure is performed. For this purpose, a strong electric field of several kV/mm is applied to create an asymmetry in the previously unorganized ceramic compound. The electric field causes a reorientation of the spontaneous polarization and at the same time, domains with a favorable orientation to the polarity field direction grow while those with an unfavorable orientation are suppressed. This procedure produces a variation inside the crystal structure of the material and domain walls are shifted in the crystal lattice. After polarization, most of the reorientations are preserved even without the application of an electric field. However, a small number of the domain walls are shifted back to their original position due to internal mechanical stresses.

This induced domain reorganization, as mentioned above, produce a displacement inside the lattice structure that is well preserved under certain characteristic temperature of the material, such as the so-called Curie Temperature (TC). At temperatures below the TC, the lattice structure of the PZT crystallites may become distorted and asymmetric which may cause the formation of dipoles, which are of interest for piezo technology. At temperatures above the TC, the piezoceramic material may lose its asymmetry inside the lattice and its piezoelectric properties may be lost.

Piezoceramic compounds are produced in several different ways. Manufacturing techniques may be based on the mechanical hydraulic pressing of spray-dried granular material. After production, the compound is sintered at temperatures of up to approx. 1300° C. This leads to a shrinkage of the body volume by approximately 30%. The result is a solid ceramic material having high density. Later, the piezoelectric material is polarized as described above and then the sintered ceramic, which is very hard, can be sawn and machined, if required. The compacts come in different shapes as disks, plates, rods, and cylinders. The last phase of the manufacturing process comprises the deposition of electrodes. Electrodes are applied to the piezoceramic material by screen-printing technology or PVD (sputtering) and subsequently baked at temperatures above 800° C. Film thicknesses may be from 1 μm to 10 μm depending on the sensor final application.

Polarized piezoelectric materials are characterized by several coefficients and relationships. In simplified form, the basic relationships between the electrical and elastic properties can be represented as follows:

$$D=d \cdot T+\varepsilon^T \cdot E$$

$$S=S^E \cdot T+d \cdot E$$

where D is the electric flux density, T the mechanical stress, E the electric field, S the mechanical strain, d the Piezoelectric charge coefficient, $\varepsilon^T$ the permittivity and $S^E$ the elasticity coefficient. These relationships apply to small electrical and mechanical amplitudes, or so-called small signal values. In this range, the relationships between mechanical, elastic deformation S or stress T, and electrical field E or electrical flux density D are linear, and the values for the coefficients are constant.

As shown in FIG. 1, the directions are designated by 1", 2", and 3", corresponding to axes X, Y and Z of the classical right-hand orthogonal axis set. The rotational axes are designated with 4", 5" and 6" (FIG. 1). The direction of polarization (axis 3") is established during the poling process by a strong electrical field applied between the two electrodes.

A parameter is the piezoelectric charge coefficient which is the ratio of induced electric charge to mechanical stress or, in other words, the ratio of achievable mechanical strain to electric field applied. Since the piezoelectric material is anisotropic, the corresponding physical quantities are described by tensors:

$$d = \begin{pmatrix} d_{11} & d_{12} & d_{13} & d_{14} & d_{15} & d_{16} \\ d_{12} & d_{22} & d_{23} & d_{24} & d_{25} & d_{26} \\ d_{13} & d_{23} & d_{33} & d_{34} & d_{35} & d_{36} \\ d_{14} & d_{24} & d_{34} & d_{44} & d_{45} & d_{46} \\ d_{15} & d_{25} & d_{35} & d_{45} & d_{55} & d_{56} \\ d_{16} & d_{26} & d_{36} & d_{46} & d_{56} & d_{66} \end{pmatrix}$$

Piezoelectric devices can include pressure and shear sensors. The first type is sensitive to normal mechanical stress and its behavior is controlled by the $d_{33}$ component of a piezoelectric charge coefficient tensor. The second type (i.e., a shear sensor) is sensitive to the relative sliding of the two faces (upper and lower) of the sensor and its response depends to non-diagonal dis component of d matrix.

Therefore, it may be desirable for a shear sensor to have a large dis and small das component in order to minimize the cross-talk between normal and tangential components of the applied external force.

Screen-printing technology is a fast and low cost process. This technique is used in printed electronics, and is one of the most promising technologies to manufacture a wide range of electronic devices. The advantages of screen-printed sensors include sensitivity, selectivity, possibility of mass-production and miniaturization.

Screen-printing technology consists of depositing successive layers of special inks or pastes onto an insulating substrate. The pastes are usually based on a polymeric binder with metallic dispersions or graphite, and can also contain functional materials such as cofactors, stabilizers and mediators.

The advantage of screen-printed technology resides in the possibility for the manufacturing of all the phases of the device fabrication in a single step, that is, from electrode to material deposition. An obstacle to overcome is related to in-situ polarization of the fabricated device. Meanwhile, the procedure may be very simple for the polarization of pressure sensor, but may be difficult for sensors that require a large longitudinal polarization component.

The devices fabricated using this type of technology are typically very thin (h=10+100 μm) and does not have particular limitation in geometry or planar extension. Taking advantage of these geometrical properties is possible to define some electrodes configuration in order to control the field direction, with the aim of obtaining preferential polarization directions.

A smart brake pad is a sensorized brake pad configured (e.g., with appropriate software and hardware system architecture and some algorithms) to measure one or more parameters, such as the brake pad temperature and/or static and dynamic quantities including normal and shear forces applied during braking.

A shear force sensing device can comprise a sheet of screen-printed piezoelectric material having on each of two parallel main faces a pair of screen-printed interdigitated electrodes.

Those main faces parallel to each other identify a shear stress direction of the shear sensing device.

Each electrode on one main face is aligned with a corresponding electrode on the other main face along a reading direction orthogonal to the stress shear direction.

In certain implementations, all electrodes, although with a different interconnection, are intended for use both for the initial bulk polarization of the piezoelectric material and later on for pick up of shear force signal.

The screen-printing of the piezoelectric sheet can allow a robust design and a cost reduction in an industrial production process of a sensorized object, for instance a smart brake pad.

Compared to other technologies currently on the market for piezoelectric shear sensors, the screen-printing technology reduces the production steps due to the fact that the sensor, once produced on the object to be sensorized, can also be polarized "in situ". That is, in contrast to manufacturing methods in which the piezoelectric material is polarized during or just after the manufacturing process of the sensor, the piezoelectric material of the present disclosure may be polarized after the sensor has been manufactured and installed into an application due to the relatively low voltage required to polarize the piezoelectric material of the present disclosure. Therefore, it is not necessary to produce the sensor, polarize it and then install it on the object. Alternatively, the piezoelectric material of the present disclosure may be polarized during the manufacturing process of the sensor itself.

Even further, in contrast to manufacturing methods in which the piezoelectric material is polarized during the manufacturing process of the sensor, the piezoelectric material of the present disclosure may be polarized or re-polarized while installed in the application (e.g., in a brake pad) due to the relatively low voltage required to polarize the piezoelectric material of the present disclosure.

A limit of the above described features lies in that, when used to read the shear force signal, electrodes collect a significant amount of charges produced in the normal direction as well that may complicate to some extent the correct interpretation of the signal.

WO2019/171289 discloses an architecture of interdigitated electrodes to read shear forces.

Various embodiments of the present disclosure can address one or more of the aforementioned concerns, or other concerns.

For example, in some embodiments, include providing a vehicle brake pad characterized in that of comprising: a support plate; a friction pad; at least a shear force sensing device; and an electrical circuit configured to collect signals from said at least a shear force sensing device; wherein said shear force sensing device comprises: a sheet of piezoelectric material having a first and a second main faces parallel to each other identifying a shear stress direction; at least a first digitated reading electrode located on said first main face; at least a second digitated reading electrode located on said second main face, said first and second reading electrodes having digits aligned along a reading direction orthogonal to said shear stress direction; at least a first digitated polarizing electrode located on said first main face and interdigitated with said first digitated reading electrode; and at least a second digitated polarizing electrode located on said second main face and interdigitated with said second digitated reading electrode. Said piezoelectric material having a bulk electric polarization with vector field transversally oriented to said reading direction, each pair of aligned digits of said first and second reading electrodes enclosing a respective region of said piezoelectric material having the vector field most tangentially oriented to said shear stress direction.

Providing a suitable polarization strategy and geometry of electrodes applied on the opposite main faces of the sheet of piezoelectric material, makes it possible to obtain a polarization field with a very small normal component. To this end, a sheet of piezoelectric material is made with great planar extension L in respect to the thickness h.

In more detail, the L surface dimension may be much larger than the h linear dimension in order to minimize the distortions of the electric fields in the signal collection area.

In an embodiment of the vehicle brake pad, said sheet of piezoelectric material is made of a screen-printed layer.

In an embodiment of the vehicle brake pad, said first and second reading electrodes and said first and second polarizing electrodes are each made from a screen-printed layer.

In an embodiment of the vehicle brake pad, digits of said first and second polarizing electrodes have an offset along said shear stress direction.

In an embodiment of the vehicle brake pad, each pair of aligned digits of said first and second reading electrodes is in between adjacent digits of said first and a second polarizing electrodes along said shear stress direction.

In an embodiment of the vehicle brake pad, digits of the first and second reading electrodes are larger than digits of the first and second polarizing electrodes.

In an embodiment of the vehicle brake pad, the width of digits of the first and second reading electrodes is in a range between 60% and 85% of the distance between digits of the first and a second polarizing electrodes.

In an embodiment of the vehicle brake pad, the thickness of the piezoelectric sheet of the sensing device is between 0.15 and 0.25 mm, the width of digits of reading electrodes is between 0.1 and 0.2 mm, the width of digits of polarizing electrodes is between 0.025 and 0.1 mm, and the minimum distance between adjacent digits on the same face of piezoelectric material sheet is between 0.025 and 0.05 mm.

The present disclosure also relates to a production process of a vehicle brake pad. In some implementations, the process comprises one or more of the following steps (e.g., in a time sequence): screen-printing an electrical circuit on a support plate; screen-printing at least a shear force sensing device on said electrical circuit, said shear force being made by: screen-printing at least a first digitated reading electrode and at least a first digitated polarizing electrode on said electrical circuit; screen-printing on said first reading electrode and said first polarizing electrode a sheet of piezoelectric material having a first and a second main faces parallel to each other identifying a shear stress direction, said first main face being applied on said first reading electrode and said first polarizing electrode; screen-printing on said second main face of said sheet at least a second digitated reading electrode and at least a second digitated polarizing electrode, said first and second polarizing electrodes having an offset along said shear stress direction, said first and second reading electrodes having digits aligned along a reading direction orthogonal to said shear stress direction; applying a friction pad on said support plate; and bulk polarizing said sheet of piezoelectric material by a supply of power to said first and second polarizing electrodes to generate a vector field most tangentially oriented to said shear stress direction in regions enclosed by said digits of said first and second reading electrodes aligned along a reading direction orthogonal to said shear stress direction.

In an embodiment during bulk polarization of said piezoelectric material, said first and second reading electrodes are kept at a floating potential.

In an embodiment during bulk polarization of said piezoelectric material, said first and second reading electrodes are kept at a fixed and equal potential.

BRIEF DESCRIPTION OF THE DRAWINGS

Various embodiments are depicted in the accompanying drawings for illustrative purposes, and should in no way be interpreted as limiting the scope of this disclosure. Various features of different disclosed embodiments can be combined to form additional embodiments, which are part of this disclosure.

DETAILED DESCRIPTION

Figure 1:
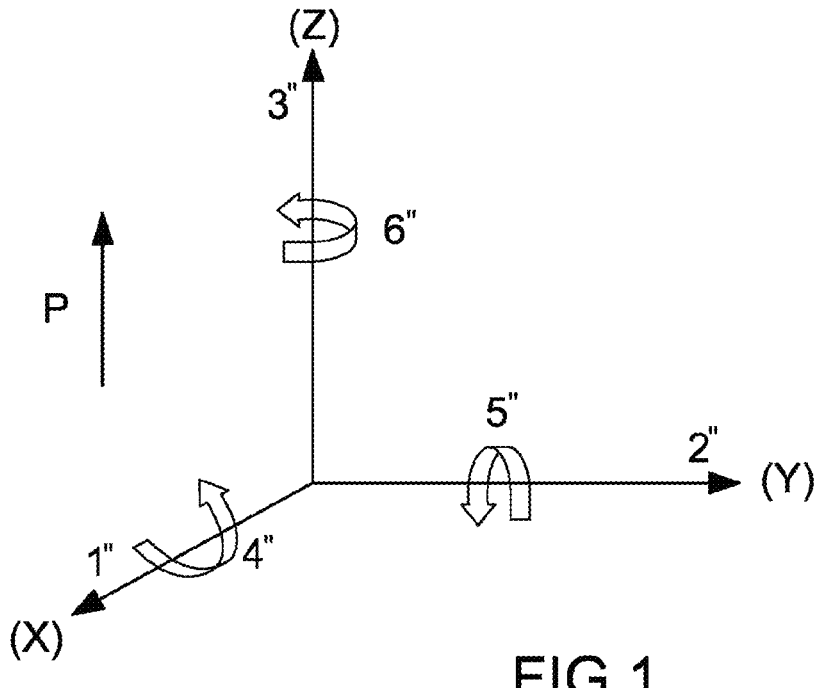
FIG. 1 schematically illustrates an orthogonal coordinate system to describe the properties of a polarized piezoelectric material.

In the following detailed description, reference is made to the accompanying drawings, which form a part hereof. In the drawings, similar reference numbers typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

With reference to FIGS. 2-6, the shear force sensing device 1 comprises a sheet 2 of piezoelectric material having a first main face 3 and a second main face 4 that are parallel to each other for identifying a shear stress direction S. On the first main face 3 of the sheet 2 of piezoelectric material, at least a first digitated reading electrode 5 is located having digits 5a. On the second main face 4 of the sheet 2 of piezoelectric material, at least a second digitated reading electrode 6 is located having digits 6a. The first and second reading electrodes 5 and 6 have digits 5a and 6a, respectively, aligned with each other along a reading direction R orthogonal to the shear stress direction S.

On the first main face 3 of the sheet 2 of piezoelectric material, at least a first digitated polarizing electrode 7 is located having digits 7a.

The first digitated polarizing electrode 7 is interdigitated with the first digitated reading electrode 5.

On the second main face 4 of the sheet 2 of piezoelectric material at least a second digitated polarizing electrode 8 is located having digits 8a.

The first digitated polarizing electrode 7 is interdigitated with the first reading electrode 5.

The first polarizing electrode 7 is positioned a distance apart from the second polarizing electrodes 8 on each respective side of the sheet 2 of piezoelectric material in a direction parallel to the shear stress direction S. In some embodiments, the distance between the first and second polarizing electrodes 7, 8 may be within a range of at least about 3 to about 5 times a thickness of the piezoelectric material. In some embodiments, the distance between the first and second polarizing electrodes 7, 8 may be less than or equal to approximately 3 times the thickness of the piezoelectric material. In some embodiments, the distance between the first and second polarizing electrodes 7, 8 may be greater than or equal to approximately 5 times the thickness of the piezoelectric material.

The first and second reading electrodes 5, 6 may be positioned opposite each other on each respective side of the sheet 2 of piezoelectric material. In some implementations, the first and second reading electrodes 5, 6 are at a location that is generally centered between the first and second polarizing electrodes 7, 8, in the direction parallel to the shear stress direction S. That is, a center of the first and second reading electrodes 5, 6 may be positioned substantially at or at a midpoint in between the first and second polarizing electrodes 7, 8, in the direction parallel to the shear stress direction S.

In some embodiments, the first and second reading electrodes 5, 6 may be positioned opposite each other at a location that is off-centered between the first and second polarizing electrodes 7, 8 and/or positioned closer to one of the first and second polarizing electrodes 7, 8. That is, a center of the first and second reading electrodes 5, 6 may be positioned closer to one of the first and second polarizing electrodes 7, 8, in the direction parallel to the shear stress direction S. In some embodiments, the first and second reading electrodes 5, 6 are positioned a distance away from the first and second polarizing electrodes 7, 8, in which the distance is at least equal to greater than at least twice the thickness of the piezoelectric material.

The piezoelectric material of the sheet 2 has a bulk electric polarization with a vector field transversally oriented (i.e., orthogonal) to the reading direction R.

In the drawings, the lines of vector field are indicated with F, while E represents the electric, $E\perp$ represents the component of the electric vector E normal to the shear stress direction S and $E\|$ represents the component of the electric vector E parallel to the shear stress direction S.

Advantageously each pair of aligned digits 5a, 6a of the first and second reading electrodes 5 and 6 enclose a respective zone 2a of the piezoelectric material of the sheet 2 having the vector E most tangentially oriented to the shear stress direction S. That is to say an $E\|$ component of the electric vector E is much larger than an $E\perp$ component of the electric vector E. In several embodiments, the magnitude of the $E\perp$ component is substantially zero and/or the magnitude of the $E\|$ component may be within a range of at least about 10 to about 100 times greater than the magnitude of the $E\perp$ component. In some embodiments, the magnitude of the $E\|$ component may at least approximately 100 times greater than the magnitude of the $E\perp$ component. In some embodiments, the magnitude of the $E\|$ component may be less than or equal to about 10 times greater than the magnitude of the $E\perp$ component.

The sheet 2 of piezoelectric material can be made of a screen-printed layer. The piezoelectric material may include synthesized polycrystalline ferroelectric ceramic material, such as barium titanate ($BaTiO_3$) and lead zirconate titanate (PZT). The piezoelectric material of the present disclosure is not limited to synthesized ceramics and may include other types of ferroelectric material. In some embodiments, the screen-printed layer of piezoceramic material may have a thickness within a range of about: 200-300 μm, 100-200 μm or 10-100 μm. In some embodiments, the screen-printed layer of piezoceramic material may have a thickness greater than about 300 μm or less than about 10 μm.

Each reading electrode 5, 6 and each polarizing electrode 7, 8 is made of a screen-printed layer as well, which is applied to the sheet 2 of piezoelectric material.

Digits 5a, 6a of the first and second reading electrodes 5 and 6 are stripes having a length and a same width.

In some embodiments, the digits 5a, 6a of the first and second reading electrodes 5 and 6 may have substantially identical widths and/or thicknesses. However, the present disclosure allows for different electrode geometries and positions on the piezoelectric material, in which the electrodes layout and the electrical potential that the electrodes may differ.

In some embodiments, the reading and polarizing electrodes 5, 6, 7, 8 may be formed from a screen-printing layer of metallic material, such as silver, gold, copper, nickel, palladium. In a certain embodiments, the reading and polarizing electrodes 5, 6, 7, 8 may be formed from silver ink or paste. In some embodiments, one or more of the reading and polarizing electrodes 5, 6, 7, 8 may be partially or fully covered by a protective material, such as a layer of insulation or ceramic glass to electrically and thermally insulate the electrodes and prevent oxidation.

In some embodiments, the electrodes 5, 7 may be screen-printed directly onto a substrate, such as an insulating substrate. The substrate may comprise a protective material. Subsequent layers may be screen-printed over the insulating substrate and previously screen-printed electrodes 5, 7. That is, the sheet 2 of piezoelectric material and the electrodes 6,

8 may be screen-printed onto the insulating substrate and the previously screen-printed electrodes 5, 7.

In an embodiment the width of the digits 5a, 6a of the first and second reading digit electrodes 5, 6 is larger than the width of the digits 7a, 8a of said first and second polarizing electrode 7, 8.

In more detail, the width w of digits 5a, 6a of the first and second reading electrodes 5, 6 is in a range between 60% and 85% of the distance d between digits 7a, 8a of the first and a second polarizing electrodes 7, 8.

This configuration of electrodes 5, 6, 7, 8, may provide the highest signal collection from reading electrodes 5, 6 with the lowest encumbrance of the sensing device 1.

Digits 7a, 8a of the first and second polarizing electrodes 7, 8 are offset to each other along the shear stress direction S.

Furthermore each pair of aligned digits 5a, 6a of the first and second reading electrodes 5, 6 is in between adjacent digits 7a, 8a of the first and a second polarizing electrodes 7, 8 along the shear stress direction S.

The present disclosure provides different electrode geometries, in which the electrodes layout and the electrical potential that the electrodes are set to may differ.

Figure 2:
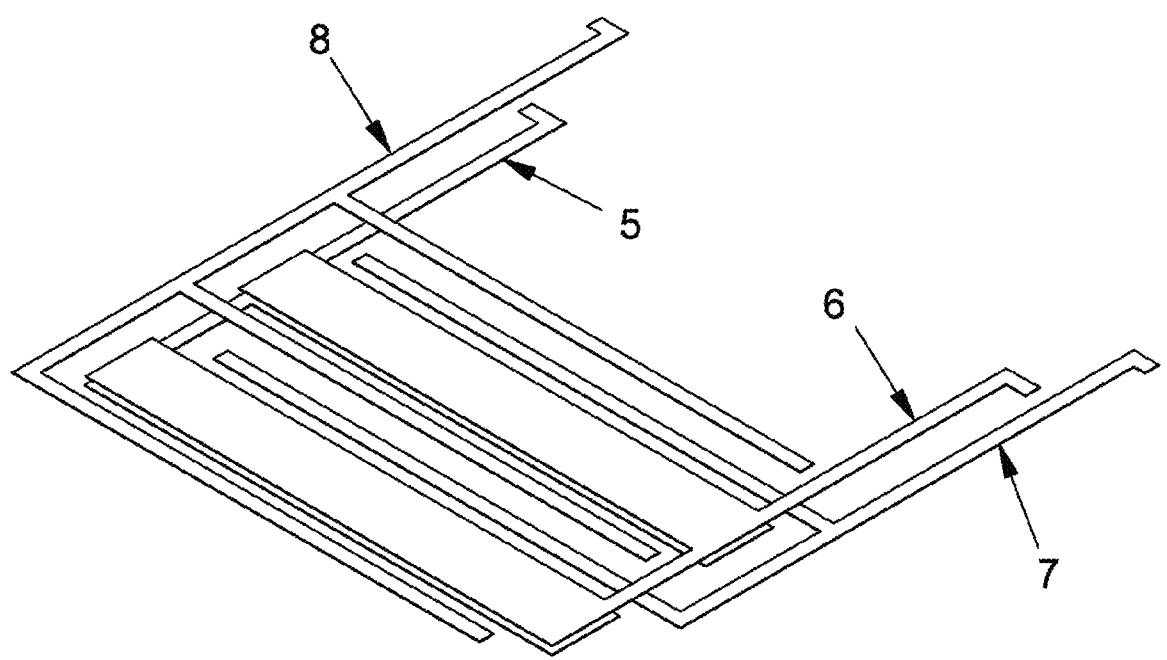
FIG. 2 schematically shows a first type of shear force sensing device in which the sheet of piezoelectric material is not represented for sake of clarity.
Figures 3, 4:
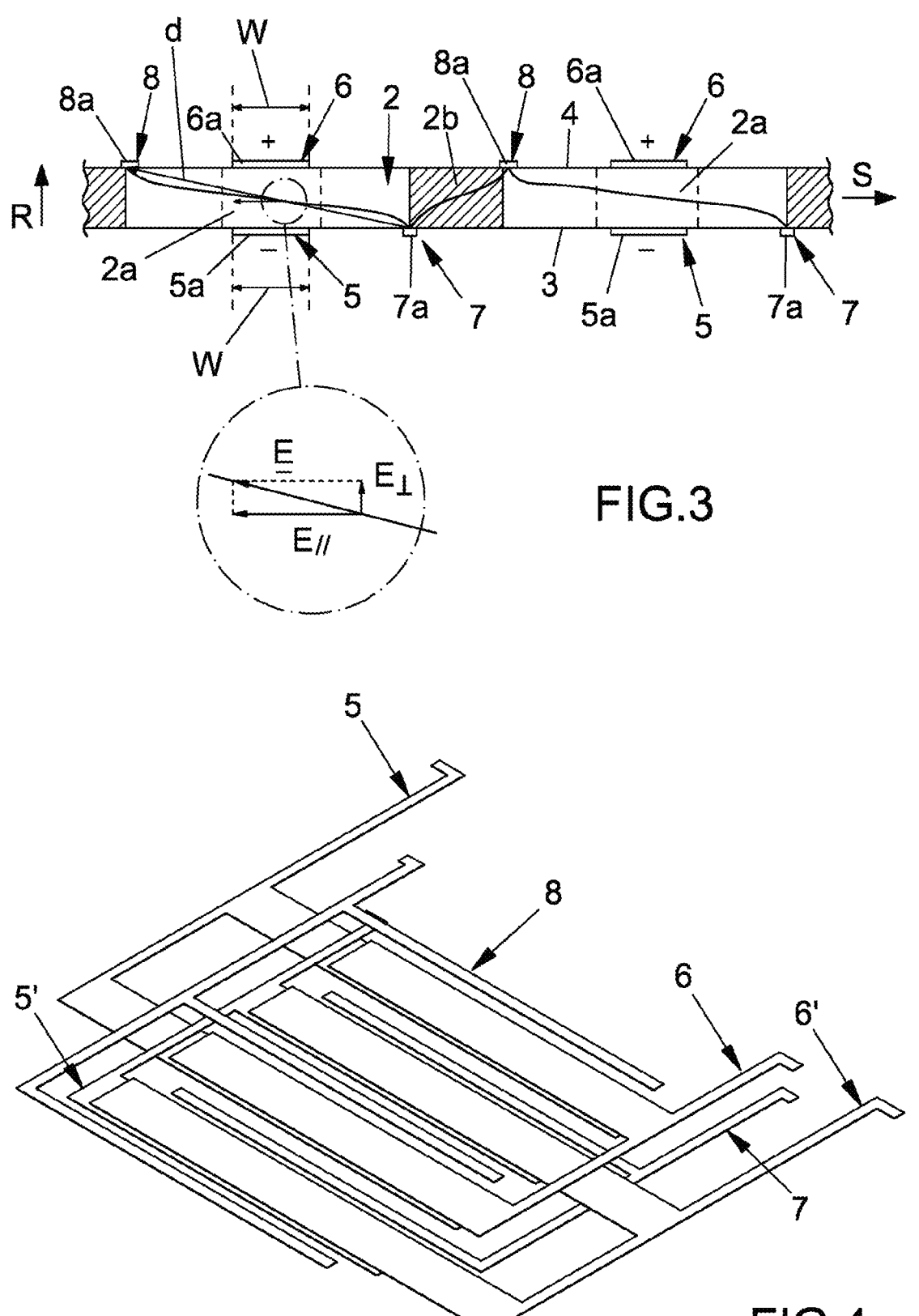
FIG. 3 schematically shows a vertical cross section of the first type of shear force sensing device in which the electric field during the polarization phase is represented.
FIG. 4 schematically shows a second type of shear force sensing device in which the sheet of piezoelectric material is not represented for sake of clarity.
Figure 5:
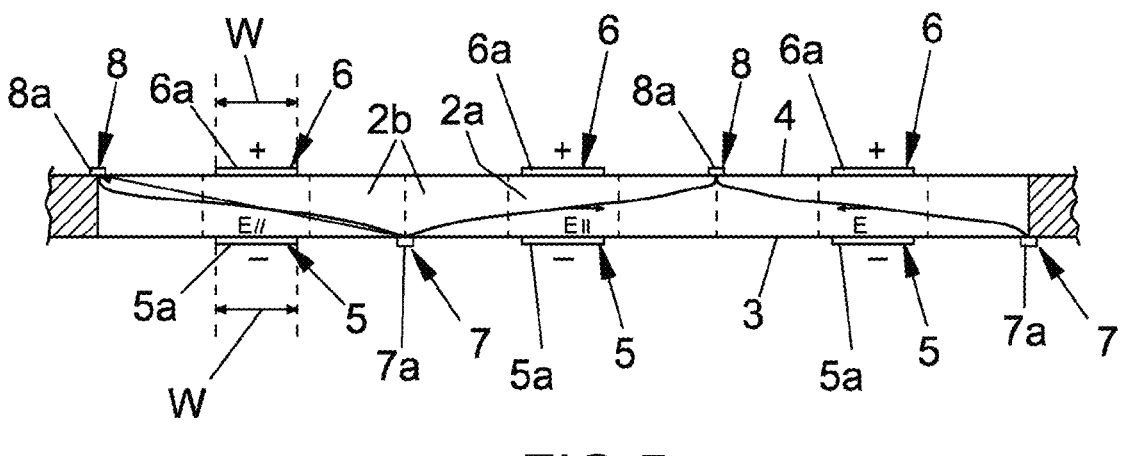
FIG. 5 schematically shows a vertical cross section of the second type of shear force sensing device where the electric field during the polarization phase is represented.

In a first embodiment, the first type of shear force sensing device 1 is represented in FIGS. 2 and 3. The shear force sensing device 1 comprises four electrodes, that is to say a single first reading electrode 5 and a single first polarizing electrode 7 on the first main face 3 of the sheet 2 of piezoelectric material, and a single second reading electrode 6 and a single second polarizing electrode 8 on the second main face 4 of the sheet 2 of piezoelectric material. The first reading electrode 5 and the first polarizing electrode 7 may be coplanar and interdigitated. The second reading electrode 6 and the second polarizing electrode 8 being coplanar and interdigitated, the first and second reading electrodes 5 and 6 having digits 5a and 6a aligned along the reading direction R. The digits 7a and 8a of the first and second polarizing electrodes 7 and 8 have an offset along the shear stress direction S. Each pair of aligned digits 5a and 6a of the first and second reading electrodes 5 and 6 are in between adjacent digits 7a and 8a of the first and a second polarizing electrodes 7 and 8 along the shear stress direction S.

The three layers of the shear force sensing device 1, which comprises lower electrodes 5 and 7, piezoelectric material 2, and upper electrodes 6 and 8, are each screen-printed in sequence, from the lowest to the topmost. Using electrodes 7 and 8 to polarize the sensor, different areas will be defined inside the bulk of the piezoelectric material. It is possible to divide the sensor in two different regions: an active region 2a and an inactive region 2b. The active regions are the regions defined within the piezoelectric material 2, where the induced field is almost longitudinal (e.g., $E\perp$ component in the electric vector E is substantially 0) and where the signal will be collected. The inactive regions conversely are the regions within the piezoelectric material 2 where the field is not with the desired orientation (e.g., not almost longitudinal). Generally, the width of the active region in which the induced field is almost or substantially longitudinal may vary according to the distance between the polarizing electrodes 7 and 8. In some embodiments, the active region may comprise a region in which the $E\perp$ component in the electric vector E is not 0 and/or has a magnitude substantially equal to the $E\|$ component. In some embodiments, the inactive regions may be unused or almost be unused.

Using this type of strategy to polarize the signal, we obtain a "sensor array" next to each other divided by "inactive" regions. Once polarized the sensor, the signal management extracts correct information from the "sensor array".

During the polarization phase, the polarizing electrodes 7 and 8 are powered, creating a mostly horizontal electric field in the piezoelectric material. Generally, the voltage required to polarize the piezoelectric material of the present disclosure may be several orders of magnitude less than previously known manufacturing methods. This may be due to the relatively small thickness of the piezoelectric material, which is formed by screen-printing. In some embodiments, the voltage applied to the polarizing electrodes 7 and 8 during the polarization phase may be between about 2 to about 3 kV/mm distance between the polarizing electrodes 7 and 8 in the shear stress direction S. In some embodiments, the voltage applied to the polarizing electrodes 7 and 8 during the polarization phase may be less than or equal to approximately 1 kV/mm, between about 1 to about 2 kV/mm, or greater than or equal to about 3 kV/mm. The voltage applied to the polarizing electrodes 7 and 8 to polarize the piezoelectric material may vary according to, for example, the size, geometry and positions of the polarizing and reading electrodes 5, 6, 7, 8, the type or thickness of piezoelectric material, etc.

During the polarization phase, reading electrodes 5 and 6 are kept either at a floating potential or at a fixed and equal potential to avoid distortion of the electric field nearby.

During the reading phase, the polarizing electrodes 7 and 8 are not used but they are left in situ, while the reading electrodes 5 and 6 collect the signal produced by the deformation of the piezoelectric material 2.

The ability to polarize the piezoelectric material in situ is in contrast to manufacturing methods in which the piezoelectric material is polarized prior to or during the manufacturing process of the sensor. In situ polarizing allows the piezoelectric material of the present disclosure to be polarized after the sensor has been manufactured and installed into an application. In situ polarizing of the piezoelectric material is possible due, in part, to the relatively small thickness of the screen-printed piezoelectric material which generally requires low voltage to be polarized. As a result, a power source provided by the application may be sufficient to polarize the sensor in situ or, in other words, while the sensor is installed in the application. Therefore, in contrast to other manufacturing methods, the piezoelectric sensor of the present disclosure provides flexibility in terms of when the piezoelectric material may be polarized.

In certain implementations, the piezoelectric material of the present disclosure may be polarized during the manufacturing process of the sensor itself. For example, the piezoelectric material may be polarized immediately after the polarizing electrodes 7 and 8 are screen-printed onto the sheet 2 of piezoelectric material.

In some embodiments and in contrast to manufacturing methods in which the piezoelectric material is polarized during the manufacturing process of the sensor, the piezoelectric material of the present disclosure may be re-polarized while installed in the application, after already being initially polarized. In a second embodiment, the second type of sensor 1 is represented in the FIGS. 4 to 6. The shear force sensing device 1 comprises a plurality (e.g., six) of electrodes. Certain implementations includes two first reading electrodes 5, 5' and a single first polarizing electrode 7 on the first main face 3 of the sheet 2 of piezoelectric material, and two second reading electrodes 6, 6' and a single second polarizing electrode 8 on the second main face 4 of the sheet 2 of piezoelectric material. The two first reading electrodes 5, 5' and the one first polarizing electrode 7 are coplanar and interdigitated. The two second reading electrodes 6, 6' and the a single second polarizing electrode 8 are coplanar and interdigitated. Each of the two first and a corresponding of the two second reading electrodes 5, 6 and 5', 6' have digits 5a, 6a and 5'a, 6'a aligned along the reading direction R. The digits 7a and 8a of the first and second polarizing electrodes 7 and 8 have an offset along the shear stress direction S. Each pair of aligned digits 5a, 6a and 5'a, 6'a of the two first and two second reading electrodes 5, 5' and 6, 6' are in between adjacent digits 7a and 8a of the first and a second polarizing electrodes 7 and 8 along the shear stress direction S.

The three layers of the (e.g., lower) electrodes 5, 5' and 7, the piezo material 2, and the (e.g., upper) electrodes 6, 6' and 8, are each screen-printed in sequence, from the lowest to the topmost. As above already indicated, using electrodes 7 and 8 to polarize the sensor, it is possible divide the sensor in active regions 2a and inactive regions 2b.

During the polarization phase, the reading electrodes 5, 5', 6, 6' are kept either at a floating potential or at a fixed and equal potential to avoid distortion of the electric field nearby.

During the reading phase, the polarizing electrodes 7 and 8 are not used but they are left in situ, while the reading electrodes 5, 5', 6, 6' collect the signal produced by the deformation of the piezoelectric material 2.

Since there are two first and two second reading electrodes 5, 6 and 5', 6', in the reading phase each couple 5, 6 and 5', 6' of reading electrodes collect two signals that are opposite in sign.

Figure 6:
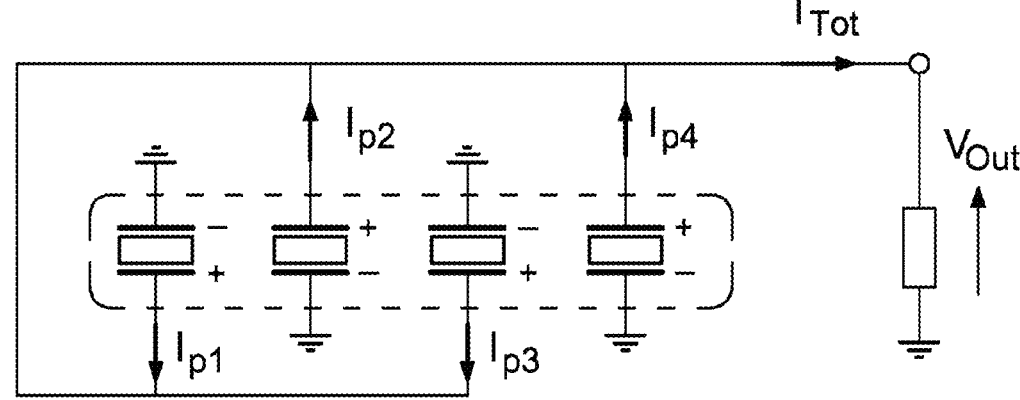
FIG. 6 schematically shows an electric circuit to pick up shear force signal from the second type of shear force sensing device.

Therefore, these signals must be combined in order to extract the correct information from the virtual "sensor array" as shown in FIG. 6.

In the electrical reading circuit the signal Vout is measured through a resistor $R_L$.

To get a correct signal combination current $I_{p1}$ and $I_{p3}$ from reading electrodes couples 5, 6 and current $I_{p2}$ and $I_{p4}$ from reading electrodes couples 5', 6' is collected by connecting to a reference potential (ground potential) those electrodes of the couples 5, 6 and 5', 6' lying on opposite main faces of the sheet 2 of piezo electric material.

From a 2-D finite elements simulation it is derived that that the most convenient configuration of the electrodes, that will be also the preferred embodiment, is the first type of sensor illustrated in FIGS. 2 and 3, which is polarized while reading electrodes are left at a floating potential. This way the volume of the piezoelectric material with parallel in-plane (shear) polarization is increased and/or maximized also in the area beneath the reading electrodes. That is, a width of the active region in which the induced field is almost or substantially longitudinal may be increased or maximized.

The present disclosure also relates to smart brake pads. A smart brake pad is a sensorized brake pad configured (e.g., with appropriate software and hardware system architecture and some algorithms) to measure one or more parameters, such as the brake pad temperature and/or static and dynamic quantities including normal and shear forces applied during braking.

A shear force sensing device for a smart brake pad may comprise a sheet of screen-printed piezoelectric material having on each of two parallel main faces a pair of screen-printed interdigitated electrodes. Those main faces parallel to each other identify a shear stress direction of the shear sensing device. Each electrode on one main face is aligned with a corresponding electrode on the other main face along a reading direction orthogonal to the shear stress direction.

All electrodes, although with a different interconnection, are intended for use both for the initial bulk polarization of the piezoelectric material and later on for pickup of shear force signal.

The shear force sensing device 1 as described above can be integrated into a vehicle braking pad device and polarized "in situ".

The braking pad device comprises a brake or braking pad 100 comprising a support plate 21, a friction pad 20, and an electrical circuit equipped with sensors 1, 11, 13 for real-time detection of signals relating at least to shear forces and preferably also to temperatures and/or to normal forces.

Figure 7:
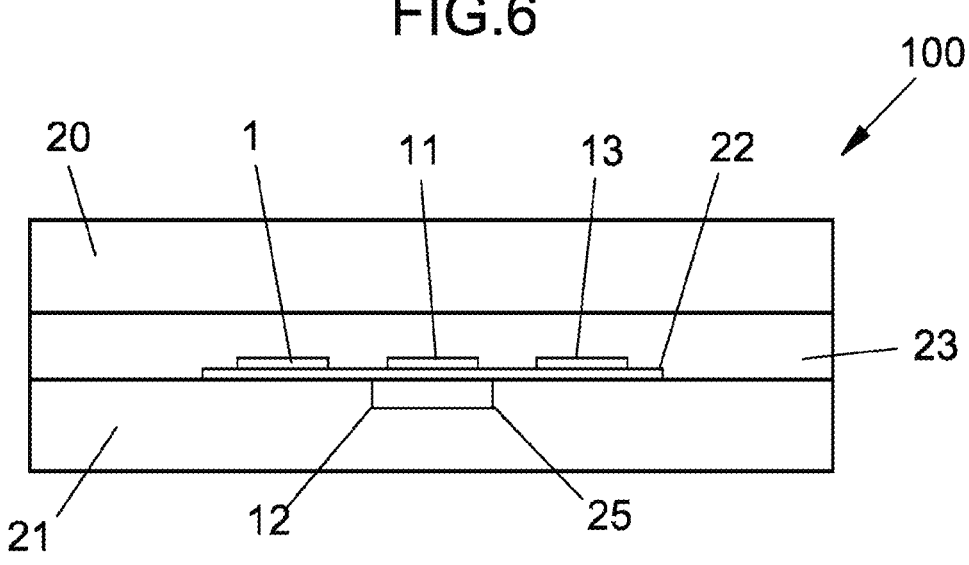
FIG. 7 schematically shows a vehicle brake pad comprising at least one shear force sensing device polarized "in situ".

In the embodiment shown in FIG. 7 the braking pad 100 comprises at least one shear force sensor of a type according to the present disclosure, at least a temperature sensor 11 and at least a normal force sensor 13.

The normal force sensors may comprise piezoceramic sensors, but alternatively can also be capacitive or piezoresistive sensors.

The temperature sensors can be thermistors, for example PT1000, PT200 or PT100.

The electrical circuit 22 has electrical terminals arranged in a region 12 for collecting the signals from said braking pad 100. The support plate 21, preferably but not necessarily made of a metal, directly supports the electrical circuit 22. The friction pad 20 is applied on the side of the support plate 21 where the electrical circuit 22 is present, the electrical circuit 22 is thus incorporated between the support plate 21 and the friction pad 20.

In some embodiments, the brake pad is provided with sensors (Piezoceramic, Piezoelectric, Capacitive, Piezoresistive, Strain Gauges or other force or deformation sensors) and it is composed mostly by four different parts: backplate (metallic support), a sensing layer on the backplate (Electronic Circuit, interconnection media and integrated force and temperature sensors), a damping layer (or Underlayer UL, as optional layer) and a Friction material layer (friction material FM).

The smart braking device may include a limited number of sensors in order to limit the number of operations and the power budget of electronics to be suitable for a wireless system for an on-board application.

During use, the brake pad can be capable of transmitting an electrical signal which is proportional to the braking forces applied to said braking element as a result of coming into contact with the element being braked, a braking element that is both easy to be constructed and easily usable.

The shear sensor may have, preferably, at least 0.2 mm of thickness of the sheet of piezoceramic material with operating temperature higher than 200° C.

In various embodiments, the shear force sensor allows measurement of wear, the residual drag, and/or braking torque.

The electrical circuit 22 on which the sensors 1, 11, 13 are installed is electrically insulated. The electrical circuit 22 has appropriately shaped branches to arrange the sensors 1, 11, 13 in discrete positions on the support plate 21. The electrical circuit 22 can be a screen-printed circuit. As illustrated a damping layer 23 can be included, which coats the electrical circuit 22 and is interposed between the friction pad 20 and the support plate 21.

The smart pad 100, as mentioned, is provided with appropriate sensors 1, 11, 13 and able in working conditions to transmit electrical signals proportional to at least shear forces applied to the braking element due to the contact with the element subject to braking. The shear forces can be processed in order to estimate the braking torque and/or the residual braking torque and/or the wear on the braking pad 100.

The braking device is applied to the brake caliper of a vehicle. In particular, at least a braking device is included for each braking caliper, and therefore for example a total of at least four braking devices on-board the vehicle.

Although certain shear force sensing devices, systems, and methods of manufacture have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof. Use with any structure is expressly within the scope of this invention. Various features and aspects of the disclosed embodiments can be combined with or substituted for one another in order to form varying modes of the assembly. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be interpreted as limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

Various illustrative embodiments of shear force sensing devices, systems, and methods of manufacture have been disclosed. Although the devices, systems, and methods have been disclosed in the context of those embodiments, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The invention claimed is:

1. A vehicle brake pad comprising:
a support plate;
a friction pad;
at least a shear force sensing device; and
an electrical circuit configured to collect signals from said at least a shear force sensing device;
wherein said shear force sensing device comprises:
a piezoelectric material comprising a first face and a second faces opposite the first face, the first and second faces extending parallel to each other in a shear stress direction;
a first reading electrode positioned on the first face and comprising a first reading digit;
a second reading electrode positioned on said second face and comprising a second reading digit, said first and second reading electrodes aligned with each other along a reading direction that is orthogonal to said stress shear direction;
a first polarizing electrode positioned on said first main face and interdigitated with said first reading electrode;
a second polarizing electrode positioned on said second face and interdigitated with said second reading electrode;
in a first region of said shear force sensing device, said piezoelectric material has a polarization vector field that is transversally oriented to said reading direction, in a second region of said shear force sensing device, said piezoelectric material has a polarization vector field that is tangentially oriented relative to said shear stress direction
wherein said first polarizing electrode comprises a first polarizing digit, and said second polarizing electrode comprises a second polarizing digit, and wherein said first and second reading digits are larger than digits of said first and second polarizing electrodes.

2. The vehicle brake pad according to claim 1, wherein said sheet of piezoelectric material comprises a screen-printed layer.

3. The vehicle brake pad according to claim 1, wherein said first and second reading electrodes and said first and second polarizing electrodes comprises a screen-printed layer.

4. The vehicle brake pad according to claim 1, wherein:
said first polarizing electrode comprises a first polarizing digit,
said second polarizing electrode comprises a second polarizing digit and
said first and second polarizing digits are at offset distance in said shear stress direction.

5. The vehicle brake pad according to claim 1, wherein said first and second reading electrodes are positioned between said first and a second polarizing electrodes along said stress shear direction.

6. The vehicle brake pad according to claim 1, wherein a width of said first and second reading digits is within a range between 60% and 85% of a distance between said first and second polarizing electrodes.

7. A vehicle brake pad comprising:
a support plate;
a friction pad;
at least a shear force sensing device; and
an electrical circuit configured to collect signals from said at least a shear force sensing device;
wherein said shear force sensing device comprises:
a piezoelectric material comprising a first face and a second face opposite said first face, said first and second faces extending parallel to each other along a shear stress axis;
a first reading electrode positioned on said first face and comprising a first reading digit;
a second reading electrode positioned on said second face and comprising a second reading digit;
a first polarizing electrode positioned on said first face, said first polarizing electrode comprising a first polarizing digit; and
a second polarizing electrode positioned on said second face, said second polarizing electrode comprising a second polarizing digit;
wherein, along said shear stress axis, said first reading digit and said second reading digit are positioned between said first polarizing digit and said second polarizing digit,
and wherein said first and second reading digits are larger than digits of said first and second polarizing electrodes.

8. The vehicle brake pad according to claim 7, wherein said first and second reading digits are aligned from each other along a reading direction that is orthogonal to said shear stress axis.

9. The vehicle brake pad according to claim 7, wherein said first and second polarizing digits are offset from each other along said shear stress axis.

10. The vehicle brake pad according to claim 7, wherein:
said first reading electrode further comprises a second first reading digit;
said first polarizing electrode further comprises a second first polarizing digit; and
along said shear stress axis, said first reading digit and said second first reading digit are positioned between said first polarizing digit and said second first polarizing digit.

11. The vehicle brake pad according to claim 7, wherein said first and second polarizing electrodes are configured to induce a field that is substantially parallel to said shear stress axis.

12. The vehicle brake pad according to claim 7, wherein a width of said first and second reading digits is within a range between 60% and 85% of a distance between said first and second polarizing digits.

13. The vehicle brake pad according to claim 7, wherein each of said first and second reading electrodes and said first and second polarizing electrodes (7, 8) comprises a screen-printed layer.

14. A method of manufacturing a vehicle brake pad, the method comprising:
  mating an electrical circuit on a support plate;
  mating a piezoelectric assembly on said electrical circuit, wherein obtaining said piezoelectric assembly comprises:
    mating a first reading electrode to a first face of a piezoelectric material, said first reading electrode comprising a first reading digit;
    mating a first polarizing electrode comprising a first polarizing digit to said first face of said piezoelectric material;

mating a second reading electrode to a second face of said piezoelectric material, said second reading electrode comprising a second reading digit; and
    mating a second polarizing electrode comprising a second polarizing digit to said second face said piezoelectric material;
  wherein said first and second polarizing electrodes are offset along said shear stress direction; and
  wherein said first and second digits being aligned along a reading direction that is orthogonal to said stress shear direction;
  wherein said first and second reading digits are larger than digits of said first and second polarizing electrodes;
  mating a friction pad on said support plate; and
  polarizing said piezoelectric assembly, wherein polarizing said piezoelectric assembly comprises:
  supplying electric power to said first and second polarizing electrodes; and
  generating a vector field that is substantially parallel to said shear stress direction in a region between said first and second digits,
    and wherein polarizing said piezoelectric assembly further comprises maintaining said first and second reading electrodes at a floating potential.

15. The method according to the claim 14, wherein mating said first reading electrode and said first polarizing electrode to said first face of said piezoelectric material comprise screen-printing said first reading electrode and said first polarizing electrode to said first face of said piezoelectric material.

* * * * *